No. 864,005. PATENTED AUG. 20, 1907.
J. P. KUHNS.
MACHINE FOR MAKING PIN TICKETS.
APPLICATION FILED JAN. 26, 1903.

3 SHEETS—SHEET 1.

Witnesses.
Thomas J. Drummond.
W. C. Lunsford.

Inventor.
John P. Kuhns,
by Crosby Gregory,
Attys.

THE NORRIS PETERS CO., WASHINGTON, D. C.

No. 864,005. PATENTED AUG. 20, 1907.
J. P. KUHNS.
MACHINE FOR MAKING PIN TICKETS.
APPLICATION FILED JAN. 26, 1903.
3 SHEETS—SHEET 2.
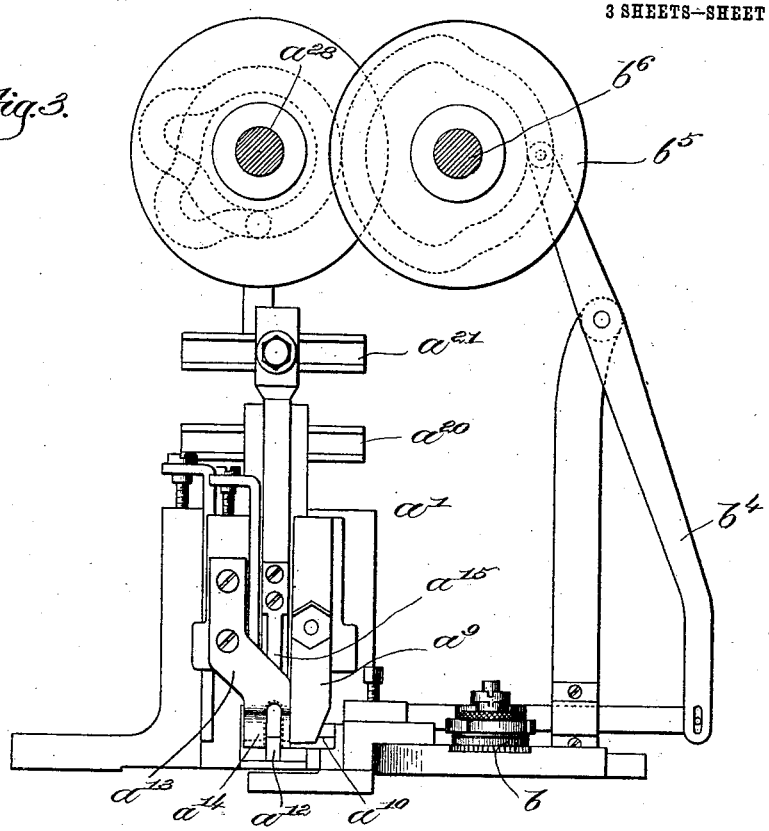
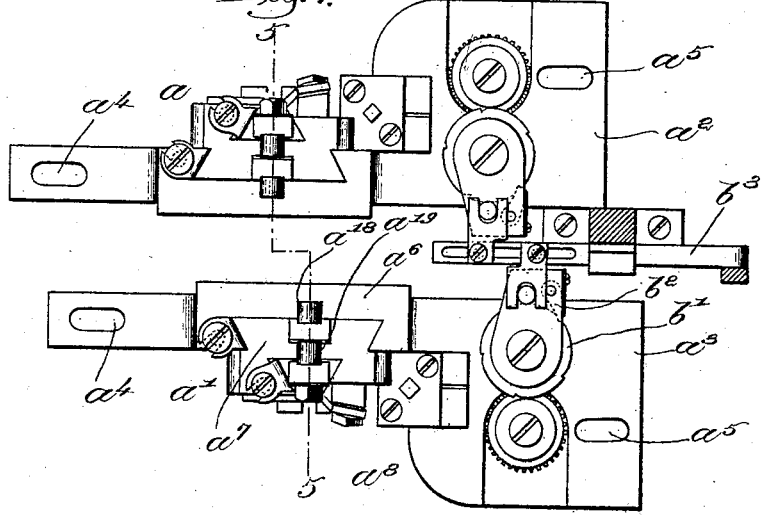

No. 864,005. PATENTED AUG. 20, 1907.
J. P. KUHNS.
MACHINE FOR MAKING PIN TICKETS.
APPLICATION FILED JAN. 26, 1903.
3 SHEETS—SHEET 3.
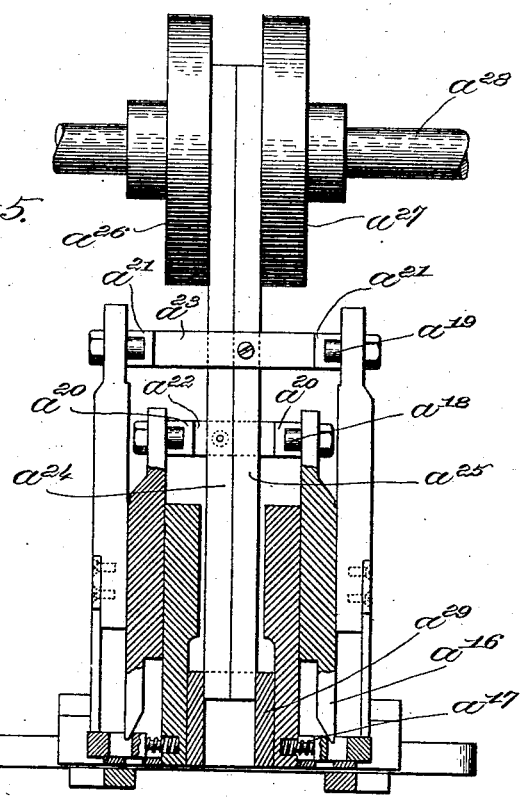
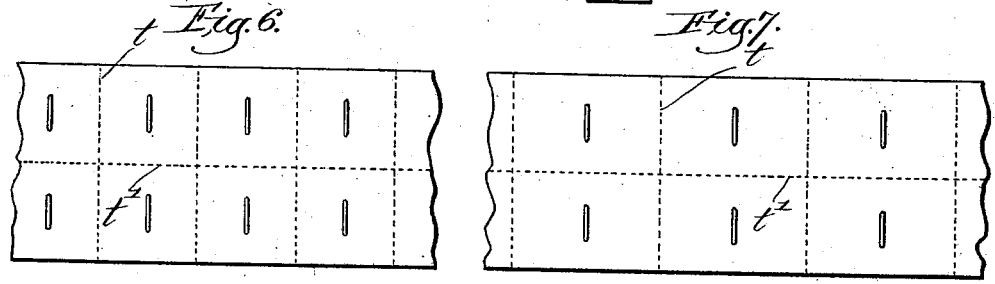
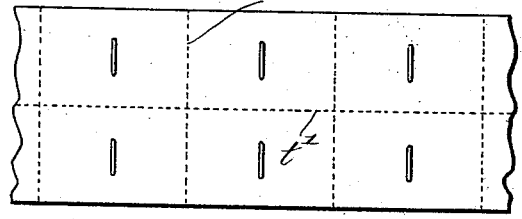
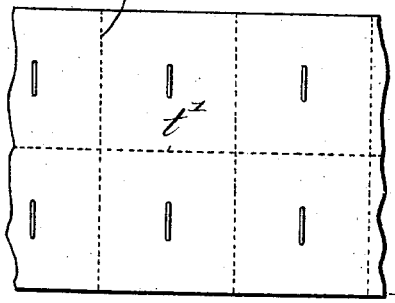
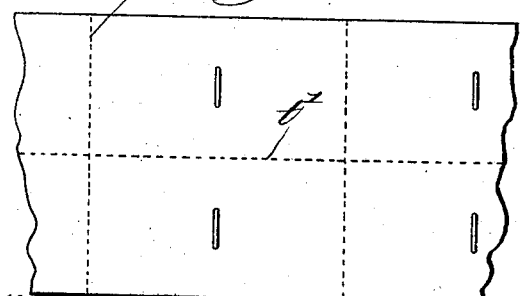
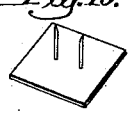
Witnesses.
Thomas J. Drummond
W. C. Lunsford
Inventor.
John P. Kuhns,
by Crosby Gregory
Attys.

UNITED STATES PATENT OFFICE.

JOHN P. KUHNS, OF DAYTON, OHIO, ASSIGNOR TO NATIONAL TAG COMPANY, OF DAYTON, OHIO, A CORPORATION OF MAINE.

MACHINE FOR MAKING PIN-TICKETS.

No. 864,005.  Specification of Letters Patent.  Patented Aug. 20, 1907.

Application filed January 26, 1903. Serial No. 140,458.

*To all whom it may concern:*

Be it known that I, JOHN P. KUHNS, a citizen of the United States, residing at Dayton, county of Montgomery, State of Ohio, have invented an Improvement in Machines for Making Pin-Tickets, of which the following description, in connection with the accompanying drawings, is a specification, like letters on the drawings representing like parts.

My invention relates to machines for making pin-tickets or tickets for labeling goods wherein a pin or staple is inserted through a piece of cardboard for securing the latter to the article to be marked, and my present invention relates more particularly to the means for readily making tickets of different sizes on the same machine.

Stated in general terms, I accomplish my object by providing a pair of staple-making and driving mechanisms adjustable laterally of the machine for different widths of tickets, and the different lengths of tickets are secured by regulating the feed of the paper and adjusting the cutting mechanism.

The constructional details of my invention will be pointed out in the course of the following description, reference being had to the accompanying drawings, in which I have shown a preferred embodiment of my invention.

Figure 1:
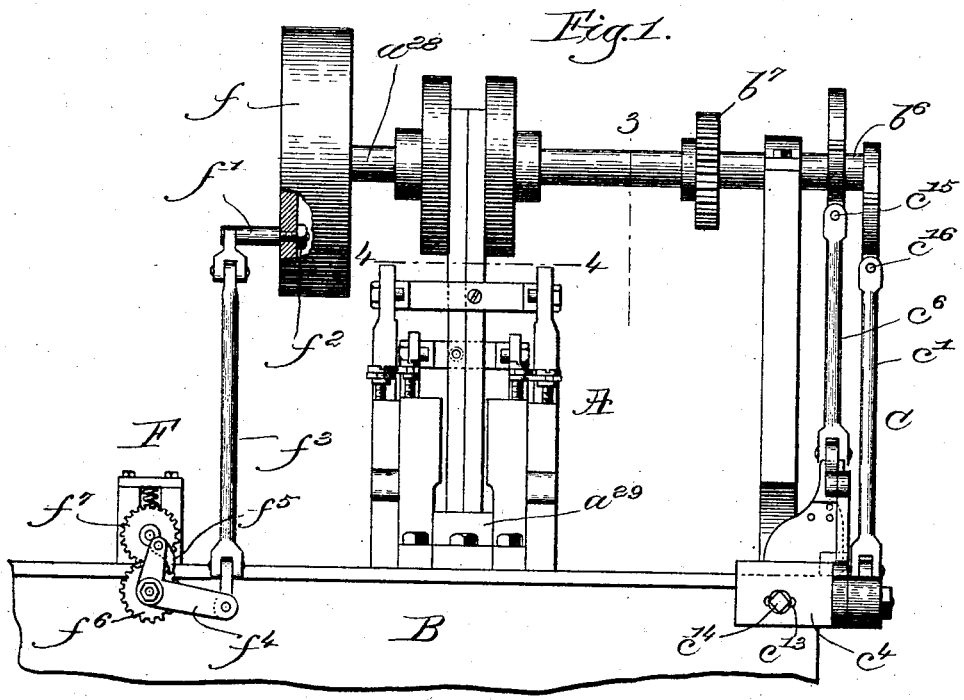
Figure 2:
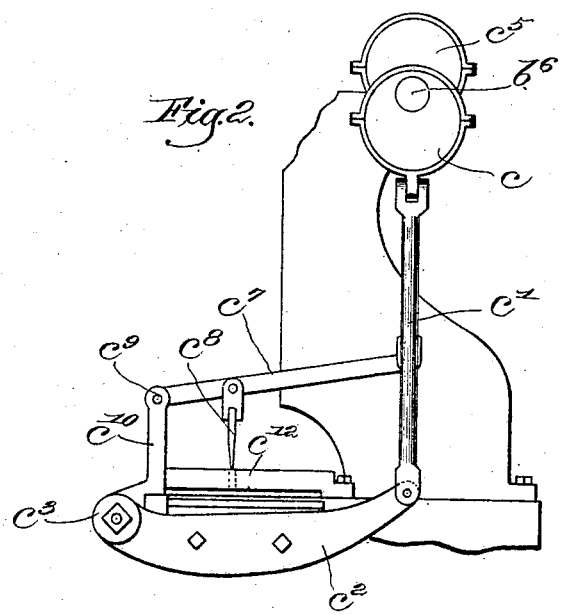

In the drawings, Figure 1 is a view in side elevation of a sufficient portion of the machine to make my invention clear; Fig. 2 is an end view thereof looking at Fig. 1 from the right; Fig. 3 is a cross-sectional detail on the line 3, Fig. 1, showing one of the staple heads in elevation; Fig. 4 is a horizontal sectional view taken on the line 4—4, Fig. 1, showing the two stapling heads in top plan; Fig. 5 is a vertical longitudinal section taken on the line 5—5, Fig. 4; Figs. 6–9 are top plan views of strips of cardboard indicating the manner of making different sized tickets; Fig. 10 is a perspective view of one of the tickets.

As herein shown, although I do not intend to limit myself to the particular forms and arrangements of parts herein shown, the stapling mechanism A, feeding mechanism F, and cutting mechanism C, are mounted on a suitable bed B, and only the parts have been presented in the drawings which are necessary for clearness of description, although it will be understood that the complete machine is much more elaborate.

Referring more particularly to Figs 3 and 4 it will be seen that I provide two staple heads $a$, $a'$, these heads being similar in construction and arranged back to back and having their bases $a^2$, $a^3$ extending transversely of the bed B and provided with elongated slots $a^4$, $a^5$ for lateral adjustment of the machine. As these heads are alike, it will be sufficient to describe one of them.

The base is provided with a guide block $a^6$ which carries a vertical slide $a^7$, which in turn carries another vertical slide $a^8$, the former at its face being provided with a knife $a^9$ set obliquely to the direction of travel of the wire, as shown in Fig. 4, for severing the wire as the latter passes through a groove $a^{10}$ over an anvil $a^{12}$, and also carries a staple former $a^{13}$, whose bifurcated lower end $a^{14}$ is arranged to form the staple over the anvil $a^{12}$. The slide $a^8$ carries a driver $a^{15}$ which operates in the opening of the bifurcated end $a^{14}$ to drive the staple after the latter has been formed by the former $a^{13}$, and also carries an anvil retractor $a^{16}$ whose cam-shaped lower end moves the anvil back at the proper time against the action of a spring $a^{17}$ at the rear of the anvil.

The corresponding parts of both heads are operated at the same time, so that two staples are simultaneously driven in the web, the staple of the head $a'$ being driven in the paper in advance of the head $a$ according to the distance one head is set ahead of the other on the bed of the machine, and the number of staples driven in a given length of the paper depending upon the rate of feed of the paper, said staples being brought opposite each other by regulating the feed so that the number of reciprocations of the staple driving mechanism will exactly divide the longitudinal distance apart of the staple heads.

The upper ends of the respective slides are provided with rolls $a^{18}$, $a^{19}$ which rest in grooved bars $a^{20}$, $a^{21}$, extending transversely of the machine for permitting the respective staple heads to be adjusted, one toward the right, Figs. 3, 4, and one towards the left, for different widths of tickets, the bars $a^{20}$ being supported by a frame $a^{22}$ and the bars $a^{21}$ by a frame $a^{23}$, the former frame being secured rigidly to a vertical rod or plunger $a^{24}$ and the latter frame $a^{23}$ to a similar rod or plunger $a^{25}$. The rod $a^{24}$ is operated by a cam $a^{26}$ and the rod $a^{25}$ by a cam $a^{27}$ on a shaft $a^{28}$, and these rods are guided at their lower ends by a block $a^{29}$.

The wire is fed from a suitable reel, not shown, by any convenient means, that herein shown consisting of grooved friction wheels or carriers $b$ actuated by a ratchet $b'$ whose pawl $b^2$ is reciprocated by a bar $b^3$ and lever $b^4$ from a cam $b^5$ on a shaft $b^6$ driven from the main shaft $a^{28}$ by gearing $b^7$. At its rear end the shaft $a^{28}$ carries a disk $f$ in whose face is a pin $f'$ radially adjustable therein by the nut $f^2$ and connected by a link $f^3$ to a bell crank $f^4$, whose pawl $f^5$ operates a gear $f^6$ of a lower feed-roll in mesh with the gear $f^7$ of an upper feed-roll, so that by varying the throw of this bell-crank the feed of the paper may be regulated. At its front end the shaft $b^6$ is provided with an eccentric $c$ connected by a link $c'$ to a knife $c^2$ pivoted at $c^3$ on a frame $c^4$. Said shaft also carries an eccentric $c^5$ connected by a link $c^6$ and lever $c^7$ to a slitting knife $c^8$, said lever being pivoted at $c^9$ to a post $c^{10}$ of said frame $c^4$. This frame has a front edge $c^{12}$ which coöperates with the knife $c^2$ in cutting the paper transversely, as indicated by dotted lines at $t$, Figs. 6–9, the knife $c^8$ cutting the paper along the longitudinal line $t'$. The frame $c^4$ is adjustable longitudinally of the machine by means of a slot $c^{13}$ and bolt $c^{14}$, the links $c'$, $c^6$, being pivoted at $c^{15}$ $c^{16}$ to permit thereof.

By the above-explained mechanism it is entirely feasible not only to make two rows of tickets from the same web while operating the machine practically at its top speed, but to make any variety of size in width and length simply by adjusting the staple heads toward each other for narrow tickets and away from each other for wide tickets, and setting the feed for slow movement for short tickets, and for fast movement for long tickets, the cutting mechanism being adjusted accordingly.

For instance, Fig. 6 shows a small square ticket and Fig. 7 shows an oblong ticket of the same width, this difference in tickets being due solely to the change of feeds, the two sets of staples remaining at the same distance apart laterally, and Figs. 8 and 9 show, respectively, tickets that are the same width greater than the tickets in Figs. 6 and 7, but of different lengths, the staples in these tickets being further apart laterally than the staples in Figs. 6 and 7.

It will be understood that I do not intend to restrict my invention to the form of staple or to any other of the specific mechanisms herein shown, as my invention is applicable to various forms of pin-ticket machines and for making various kinds of pin-tickets, and accordingly I do not intend to limit the invention otherwise than as expressed in the claims.

Having described my invention, what I claim as new and desire to secure by Letters Patent of the United States, is:—

1. In a pin-ticket machine, means for simultaneously making a plurality of series of identical pin tickets, including a single feeding mechanism for feeding one web of material to receive a plurality of sets of fasteners in a plurality of longitudinal series corresponding to the several series of tickets, a plurality of fastener-applying mechanisms for applying to said single web said series of fasteners in longitudinal and transverse alinement, a single operating means for all the aforesaid mechanisms, and means for adjusting said sets of fastener-applying mechanisms toward and from each other laterally of said web of material without disturbing the connection thereof with said single operating means, said adjusting means including mechanism for automatically maintaining operative connection with the single operating means irrespective of the variations in position of said plurality of fastener-applying mechanisms.

2. In a pin-ticket machine, feeding mechanism for feeding an integral web of material having a width corresponding to a plurality of pin-tickets side by side, a plurality of sets of fastener-applying mechanisms constructed and arranged to apply thereto a corresponding plurality of series of fasteners in parallel longitudinal columns, means for adjusting said sets of fastener-applying mechanisms in opposite directions transversely of the direction of feed, web-severing mechanism, including means for severing the web lengthwise between said parallel longitudinal columns of fasteners and means coöperating therewith for transversely severing the individual pin-tickets from said web, and means for operating in synchronism said severing mechanism, said fastener-applying mechanisms and said feeding mechanism.

3. In a pin-ticket machine, feeding mechanism for feeding a web of material to receive fasteners, a plurality of sets of fastener-applying mechanisms for applying thereto a corresponding series of fasteners, and mechanism, coöperating with the foregoing, for making tickets of different widths and lengths having the fasteners similarly placed in all of said differing tickets, including means for adjusting said sets of mechanisms toward and from each other laterally of said web of material, and means for varying the speed of said feeding mechanism with relation to the speed of said fastener-applying mechanisms.

4. In a pin-ticket machine, feeding mechanism for feeding a web of material to receive fasteners, a plurality of sets of fastener-applying mechanisms for applying thereto a corresponding series of fasteners, web-severing mechanism, means for adjusting the same longitudinally of the web, and means for varying the speed of said feeding mechanism with relation to the speed of said fastener-applying mechanisms.

5. In a pin-ticket machine for simultaneously making a plurality of longitudinal series of pin-tickets, means for varying the sizes of said tickets, including feeding mechanism for feeding a single web of material to receive a plurality of series of fasteners, said series being arranged in opposite longitudinal columns, a plurality of sets of fastener-applying mechanisms, laterally adjustable with relation to each other transversely of the direction of feed, for applying to said single web a corresponding number of fasteners, means for simultaneously varying the relative speed of said fastener-applying mechanisms and of said feeding mechanism, and a single operating means for all of the aforesaid mechanisms.

6. In a pin-ticket machine, means for simultaneously making two longitudinal series of pin-tickets, including mechanism for feeding a double-width of material to receive fasteners, two sets of fastener-applying mechanisms arranged back-to-back transversely of the direction of feed, means for adjusting said two sets of mechanisms in opposite directions transversely of the direction of feed, longitudinal severing means, a single transverse severing device, and means for operating said severing mechanism in synchronism with said fastener-applying mechanisms, all of the aforesaid means and mechanisms being arranged and coördinated to place the individual fasteners for each of the pin-tickets while the latter are all connected in said two series and to sever said tickets only after they have all been otherwise completed.

7. In a pin-ticket machine, means for simultaneously making a plurality of series of identical pin tickets, including mechanism for feeding a double-width of material to receive fasteners, two sets of fastener-applying mechanisms, means for adjusting said two sets of mechanisms toward and from each other, a transverse cutter, for cutting across said web located ahead of said fastener-applying mechanisms the distance of a plurality of tickets, means for varying the feed for different lengths of tickets, and means for adjusting said cutter forward or backward the aliquot part of the variation of feed to correspond to the positioning of the fasteners in the web.

8. In a pin-ticket machine, means for simultaneously making a plurality of series of identical pin tickets, including mechanism for feeding a double-width of material to receive fasteners, two sets of fastener-applying mechanisms, means for adjusting said two sets of mechanisms toward and from each other, a transverse cutter, for cutting across said web located ahead of said fastener-applying mechanisms the distance of a plurality of tickets, means for operating said cutter and fastener-applying mechanisms in unison, means for varying the feed for different lengths of tickets, and means for adjusting said cutter forward or backward the aliquot part of the variation of feed to correspond to the positioning of the fasteners in the web.

9. In a pin ticket machine, means for simultaneously making a plurality of series of identical pin tickets, including mechanism for feeding a double-width of material to receive fasteners, two sets of fastener-applying mechanisms arranged back-to-back transversely of the direction of feed, and one slightly ahead of the other, means for adjusting said two sets of mechanisms in opposite directions transversely of the direction of feed, a single step-by-step feeding mechanism for said web of material, and severing mechanism coöperating therewith to cut the web simultaneously with the driving of fasteners in the period of rest between successive feeds of the web.

In testimony whereof, I have signed my name to this specification, in the presence of two subscribing witnesses.

JOHN P. KUHNS.

Witnesses:
 MARION V. DE GARNIO,
 HARLOW E. SPRING.